United States Patent
Alkharafi et al.

(10) Patent No.: US 12,113,747 B2
(45) Date of Patent: Oct. 8, 2024

(54) DYNAMIC FREQUENCY ASSIGNMENT BASED ON GPS LOCATION

(71) Applicant: Saudi Arabian Oil Company, Dhahran (SA)

(72) Inventors: Mohammad S. Alkharafi, Dhahran (SA); Abdullah A. Aseery, Dhahran (SA); Naif R. Almutairi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 314 days.

(21) Appl. No.: 17/567,803

(22) Filed: Jan. 3, 2022

(65) Prior Publication Data
US 2023/0216647 A1    Jul. 6, 2023

(51) Int. Cl.
*H04L 5/00* (2006.01)
*H04W 28/02* (2009.01)
*H04W 72/0453* (2023.01)
*H04W 72/23* (2023.01)

(52) U.S. Cl.
CPC .......... *H04L 5/0069* (2013.01); *H04L 5/0098* (2013.01); *H04W 28/0278* (2013.01); *H04W 72/0453* (2013.01); *H04W 72/23* (2023.01)

(58) Field of Classification Search
CPC .... H04L 5/0069; H04L 5/0098; H04W 72/23; H04W 72/0453; H04W 28/0278
See application file for complete search history.

(56) References Cited

U.S. PATENT DOCUMENTS

| | | | |
|---|---|---|---|
| 6,167,238 A | 12/2000 | Wright | |
| 8,374,135 B2 | 2/2013 | Sundaresan et al. | |
| 8,526,379 B2 | 9/2013 | Harvey et al. | |
| 9,088,996 B2 | 7/2015 | Buchwald et al. | |
| 9,548,821 B1* | 1/2017 | Gossett | H04J 11/005 |
| 10,732,621 B2 | 8/2020 | Cella et al. | |
| 11,029,680 B2 | 6/2021 | Cella et al. | |
| 11,522,608 B1* | 12/2022 | Desai | H04W 4/80 |

(Continued)

FOREIGN PATENT DOCUMENTS

| | | | | |
|---|---|---|---|---|
| BR | 102016013440 A2 * | 12/2016 | | B61L 15/0018 |
| EP | 3104636 A1 * | 12/2016 | | B61L 15/0018 |
| KR | 20170093071 A * | 8/2017 | | |

*Primary Examiner* — Shean Tokuta
(74) *Attorney, Agent, or Firm* — Fish & Richardson P.C.

(57) ABSTRACT

The present disclosure describes a computer-implemented method that includes: in response to receiving information that a base station from the network of base stations at the geo-exploration site has relocated, obtaining a geographic positioning information of the relocated base station; accessing a database encoding geographic positioning information of base stations from the network of base stations at the geo-exploration site, along with respective frequency assignment information for each base station; analyzing an interference pattern between the base station that has relocated and other base stations from the network that are within a threshold distance of the relocated base station, wherein the relocated base station is being considered for a radio frequency assignment based on the geographic positioning information; and determining the radio frequency assignment for the relocated base station based on the interference pattern.

14 Claims, 4 Drawing Sheets

(56) References Cited

U.S. PATENT DOCUMENTS

| | | | |
|---|---|---|---|
| 2014/0328192 A1* | 11/2014 | Barriac | H04J 1/16 |
| | | | 370/312 |
| 2017/0295582 A1* | 10/2017 | Gurney | H04W 72/542 |
| 2018/0184303 A1* | 6/2018 | Egner | H04W 24/02 |
| 2020/0103889 A1 | 4/2020 | Cella et al. | |
| 2020/0266903 A1* | 8/2020 | De Rosa | H04B 7/18506 |
| 2020/0274656 A1 | 8/2020 | Gordaychik | |
| 2020/0367063 A1* | 11/2020 | Kato | H04W 72/0446 |
| 2021/0247534 A1 | 8/2021 | Bo | |
| 2021/0410134 A1* | 12/2021 | Cheraghi | H04W 72/0453 |
| 2022/0217719 A1* | 7/2022 | Beyer | H04W 24/02 |
| 2023/0216647 A1* | 7/2023 | Alkharafi | H04W 72/0453 |
| | | | 370/329 |

* cited by examiner

DYNAMIC FREQUENCY ASSIGNMENT BASED ON GPS LOCATION

TECHNICAL FIELD

This disclosure generally relates to radio frequency (RF) spectrum allocation for wireless communication in the context of sustaining the industrial operations at a geo-exploration site that spans a large geographic area.

BACKGROUND

Radio frequency recourses are limited in the sense that the available spectrum for wireless communication does not extend infinitely. Judicious use of the limited spectrum to meet the requirements of wireless communication generally entails a well-thought out engineering planning to optimize spectrum utilization.

SUMMARY

In one aspect, some implementations provide a computer-implemented method for radio frequency assignment within a network of base stations. The method includes: in response to receiving information that a base station from the network of base stations has relocated, obtaining data encoding a geographic position of the relocated base station; accessing data encoding geographic positions of base stations from the network of base stations, and respective frequency assignment information for each base station; analyzing an interference pattern between the base station that has relocated and other base stations from the network that are within a threshold distance of the relocated base station; and determining the radio frequency assignment for the relocated base station based on the interference pattern.

Implementations may include one or more of the following features.

The analyzing may include: simulating the interference pattern when assigning the relocated base station a candidate radio frequency based on the geographic position of the relocated base station. The interference pattern may include: a co-channel interference, and an adjacent-channel interference. The analyzing may further include: computing a coverage of the relocated base station relative to the other base stations from the network that are within a threshold distance of the relocated base station. The method may further include: in response to the interference pattern falling below a first threshold level and the coverage exceeding a second threshold level, allocating the candidate radio frequency to the relocated base station. The method may further include: associating, in the database, the candidate radio frequency with the relocated base station. The analyzing may be based on an elevation of a base station, and an antenna height at the base station.

The method may further include: monitoring a utilization of the relocated base station, wherein the utilization comprises: a traffic patter, and a usage pattern of the base station; and in response to the utilization exceeding a utilization threshold, analyzing the interference pattern between the relocated base station and other base stations from the network that are within a threshold distance of the relocated base station when the relocated base station is to be assigned an updated radio frequency with increased capacity. The method may further include: in response to the interference pattern falling below the first threshold level, allocating the updated radio frequency to the relocated base station; and associating, in the database, the updated radio frequency with the relocated base station.

In another aspect, some implementations provide a computer system comprising one or more computer processors configured to perform operations of: in response to receiving information that a base station from the network of base stations has relocated, obtaining data encoding a geographic position of the relocated base station; accessing data encoding geographic positions of base stations from the network of base stations, and respective frequency assignment information for each base station; analyzing an interference pattern between the base station that has relocated and other base stations from the network that are within a threshold distance of the relocated base station; and determining the radio frequency assignment for the relocated base station based on the interference pattern.

Implementations may include one or more of the following features.

The analyzing may include: simulating the interference pattern when assigning the relocated base station a candidate radio frequency based on the geographic position of the relocated base station. The interference pattern may include: a co-channel interference, and an adjacent-channel interference. The analyzing may further include: computing a coverage of the relocated base station relative to the other base stations from the network that are within a threshold distance of the relocated base station. The operations may further include: in response to the interference pattern falling below a first threshold level and the coverage exceeding a second threshold level, allocating the candidate radio frequency to the relocated base station. The operations may further include: associating, in the database, the candidate radio frequency with the relocated base station. The analyzing may be based on an elevation of a base station, and an antenna height at the base station.

The operations may further include: monitoring a utilization of the relocated base station, wherein the utilization comprises: a traffic patter, and a usage pattern of the base station; and in response to the utilization exceeding a utilization threshold, analyzing the interference pattern between the relocated base station and other base stations from the network that are within a threshold distance of the relocated base station when the relocated base station is to be assigned an updated radio frequency with increased capacity. The operations may further include: in response to the interference pattern falling below the first threshold level, allocating the updated radio frequency to the relocated base station; and associating, in the database, the updated radio frequency with the relocated base station.

In yet another aspect, implementations provide a non-transitory computer-readable medium comprising software instructions that, when executed by a computer, causes the computer to perform operations of: in response to receiving information that a base station from the network of base stations has relocated, obtaining data encoding a geographic position of the relocated base station; accessing data encoding geographic positions of base stations from the network of base stations, and respective frequency assignment information for each base station; analyzing an interference pattern between the base station that has relocated and other base stations from the network that are within a threshold distance of the relocated base station; and determining the radio frequency assignment for the relocated base station based on the interference pattern.

Implementations may include one or more of the following features.

The operations may further include: simulating the interference pattern when assigning the relocated base station a candidate radio frequency based on the geographic position of the relocated base station, wherein the interference pattern comprises: a co-channel interference, and an adjacent-channel interference; computing a coverage of the relocated base station relative to the other base stations from the network that are within a threshold distance of the relocated base station; in response to the interference pattern falling below a first threshold level and the coverage exceeding a second threshold level, allocating the candidate radio frequency to the relocated base station; and associating, in the database, the candidate radio frequency with the relocated base station.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to spectrum allocation for base stations base stations in the context of maintaining industrial operations of, for example, a geo-exploration site that can span a vast area. Some implementations may acquire the GPS location of the radio base stations, conduct interference analysis in a dynamic frequency management system (DFMS), and then allocate the operating frequency and bandwidth for each radio base station accordingly. During the interference analysis, the DFMS may evaluate, the location of the radio base stations, the elevation and the antenna height for the base stations, the co-channel interference ratio, the adjacent-channel interference ratio, and any traffic/usage requirement.

Figure 1:
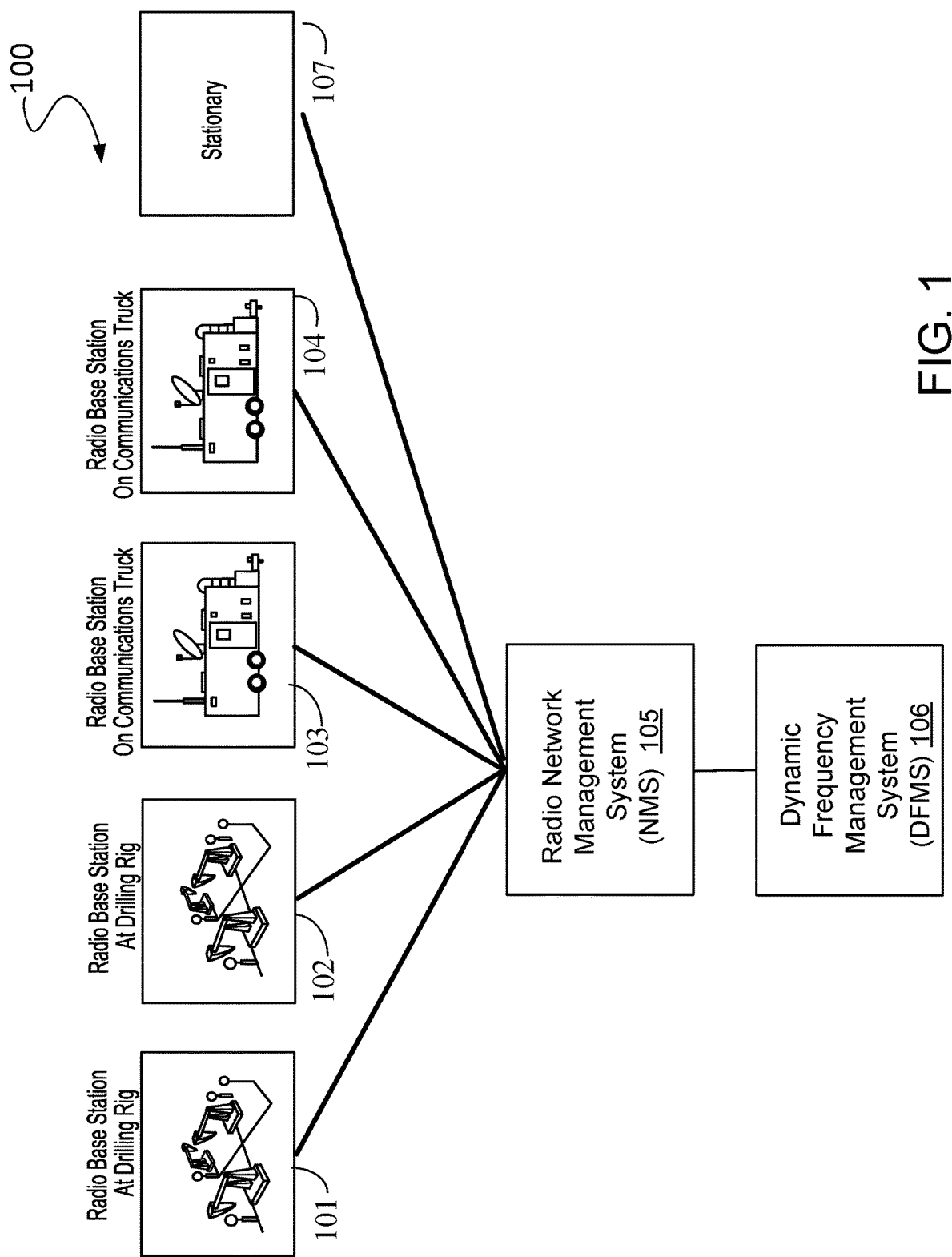
FIG. 1 shows a block diagram of a dynamic frequency assignment system according to some implementations of the present disclosure.

FIG. 1 illustrates diagram 100 showing an example of a geo-exploration network that has scattered onshore and offshore operations with hundreds of drilling rigs. As illustrated, the site includes radio base station at drilling rig 101, radio base station at drilling rig 102, radio base station on communication truck 103, and ratio base station on communication truck 104. In addition to stationary radio station 107 these radio base stations, as installed on communications trucks or onshore/offshore drilling, are periodically moving. In this context, network operations, such as Terrestrial Trunked Radio (TETRA) network Upgrade and Broadband Connectivity Solution, are regularly performed for onshore and offshore drilling rigs. For example, moving radio base station can be installed on communications trucks or onshore/offshore chilling rigs radio to provide mission critical communications for the operation of the geo-exploration network.

The conventional way to design the radio system for these base stations generally involves assigning a dedicated frequency for every radio base station without reusing the frequency anywhere else to avoid potential interference. However, this is an expensive option with annual frequency cost from a National Communications Regulatory agency such as the Federal Communications Commission (FCC) in the US, and Communications and Information Technology Commission (CITC) in Saudi Arabia. In addition, the frequency spectrum is limited and it is hard to have dedicated frequency for every radio base station in the network. Moreover, when the radio base stations become mobile and not fixed in one dwelling, old interference analysis can become stale, and updates can be challenging and perplexing.

The proposed implementations can leverage the GPS location of the radio base stations and automatically conduct interference analysis in the Dynamic Frequency Management System (DFMS) 106. The DFMS 106 may assign the right and suitable frequency from dynamic frequency list based predefined engineering and technical parameters. The DFMS 106 may evaluate relevant parameters including, but not limit to, the location of the radio base stations, the elevation and the antenna height for the base stations, co-channel interference ratio, adjacent-channel interference ratio, and traffic/usage requirement.

As illustrated in FIG. 1, radio Network Management System (NMS) 105 is connected to the radio base stations 101 to 104. The NMS 105 is also connected to the Dynamic Frequency Management System (DFMS) 106, In this example, the NMS 105 can serve as the computing server to conduct interference analysis and assign radio frequency dynamically, as one or more base stations are relocated. The DFMS 106 is a centralized backend server that manages and stores the frequency database. The DFMS 106 receives the updated GPS locations of the radio base stations 101 to 104 from radio NMS and conducts the interference analysis accordingly. After that, the DFMS 106 can select the suitable frequency for each radio base station and send frequency assignment table to the radio NMS which will push the updated frequency assignment to all the radio base stations.

Figure 2:
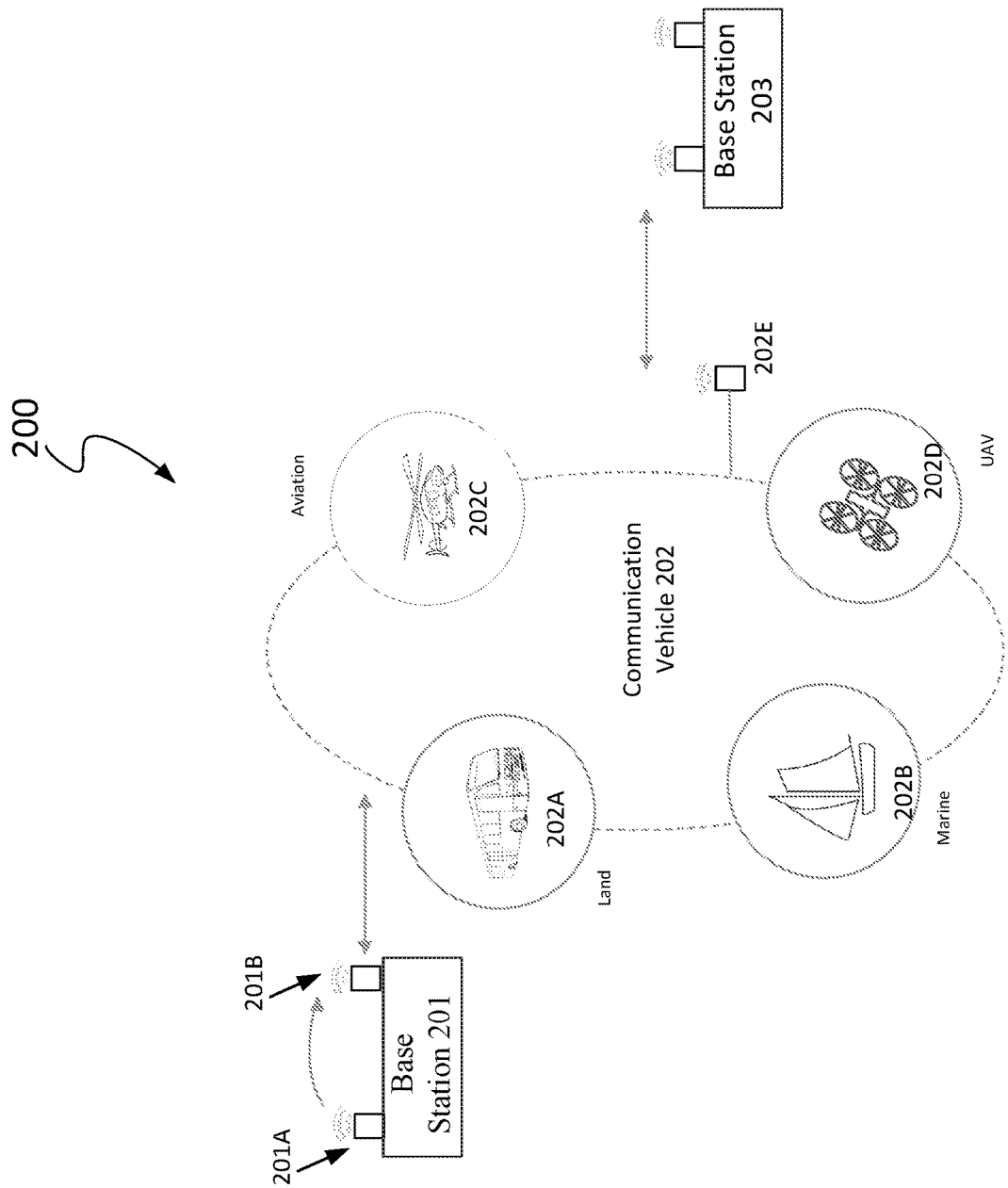
FIG. 2 illustrates a site with base stations that can be relocated according to some implementations of the present disclosure.

Referring to FIG. 2, base station 201 may reside on an oil rig that can be relocated. As illustrated, base station 201 may include antennas 201A and 201B, each may operate at adjacent channels around one frequency assigned to the ratio station 201. Base station may also reside on a communication vehicle 202. For example, base stations 202A, 202B, 202C, and 202D each respectively reside on a transport communication truck, a transport ship, a transport aircraft, or a transport unmanned vehicle (UAV). Each of the base stations 202A, 202B, 202C, and 202D can have its own antenna 202E. As illustrated, base station 203 may reside on a platform that can be relocated with antennas 203A and 203B. Through the antennas, each base station can communicate with devices within its range. Additionally, base station 201A may communicate with base stations 202A, 202B, 202C, and 202D when the communication vehicle becomes sufficiently close. Similar communication can take place between base station 203 and base stations 202A, 202B, 2020, and 202D.

By way of illustration, when a new base station is introduced, or a base station has been relocated, then its frequency will be assigned or updated accordingly. The assignment may involve a brand new frequency in the available spectrum space that never been used in the area. This scenario can be straight forward and may not require in-depth interference analysis. However, more often than not, the frequency to be assigned has been already reused in other base stations. In this more common scenario, an interference analysis is expected to analyze interferences between the existing base stations and the new one being introduced. If the base stations are sufficiently spaced apart, interference between them can be minimal, if any. However, if one or more base stations are relocated, then, the spacing between the base stations can become close enough to re-introduce sufficient mutual interference of concern. In various implementations, DFMS 106 can continuously evaluate the location of base stations in real time and assign the frequency dynamically, as the oil rigs and communication trucks are relocated.

The analysis can be performed via software tools that simulate the coverage of the base stations by considering, for example, base station location on the map (GPS Coordinate), base station elevation and antenna height (meters), co-channel interference ratio, adjacent-channel interference ratio, and traffic/usage requirement. The analysis software may simulate and then predict potential frequency interference, if any, between different base stations.

Here, co-channel refers to using exactly the same frequency (for example, first frequency and second frequency both at 410.125 MHz). Co-channel interference analysis generally evaluates relevant design parameters unique for the co-channel context. On the other hand, adjacent-channel refers to two frequencies next to each other in the spectrum domain (example a first frequency at 410.125 MHz, and a second frequency at 410.150 MHz). In this example, the first frequency and the second frequency are considered very close to each other, and hence known as adjacent-channels. As a practical matter, adjacent-channels might interfere with each other. Adjacent-channel interference analysis may evaluate relevant design parameters unique for the adjacent-channel context.

In this illustration, traffic/usage of the base station may also be evaluated regularly to avoid traffic voice/data congestion and loss of service. When a utilization threshold is reached, then the base station should be upgraded with additional frequency. In this scenario, additional frequency can be assigned based on frequency analysis as explained earlier.

For context, radio frequencies are limited resources and managed by a National Communications Regulatory Authority. Examples include the Federal Communications Commission (FCC) in the US, or Communications and Information Technology Commission (CITC) in Saudi Arabia. The National Communications Regulatory Authority may distribute frequency channels to companies and governments agencies according to their needs and their geographical location. For example, company A can have a list of approved frequencies in certain geographical locations and company A may have exclusive use of these list of frequencies. In this example, the frequency database of company A can include information of, for example, specification of approved frequencies from the National Communications Regulatory Agency; listing of base station(s) where each frequency is operated, reused, or reserved for future expansion; global positioning system (GPS) coordinate of each base station; elevation of each base station; antenna height; antenna gain, and radiation angle, etc. RF assignment according to implementations of the present disclosure can then be performed on the basis of the information in the frequency database.

Figure 3:
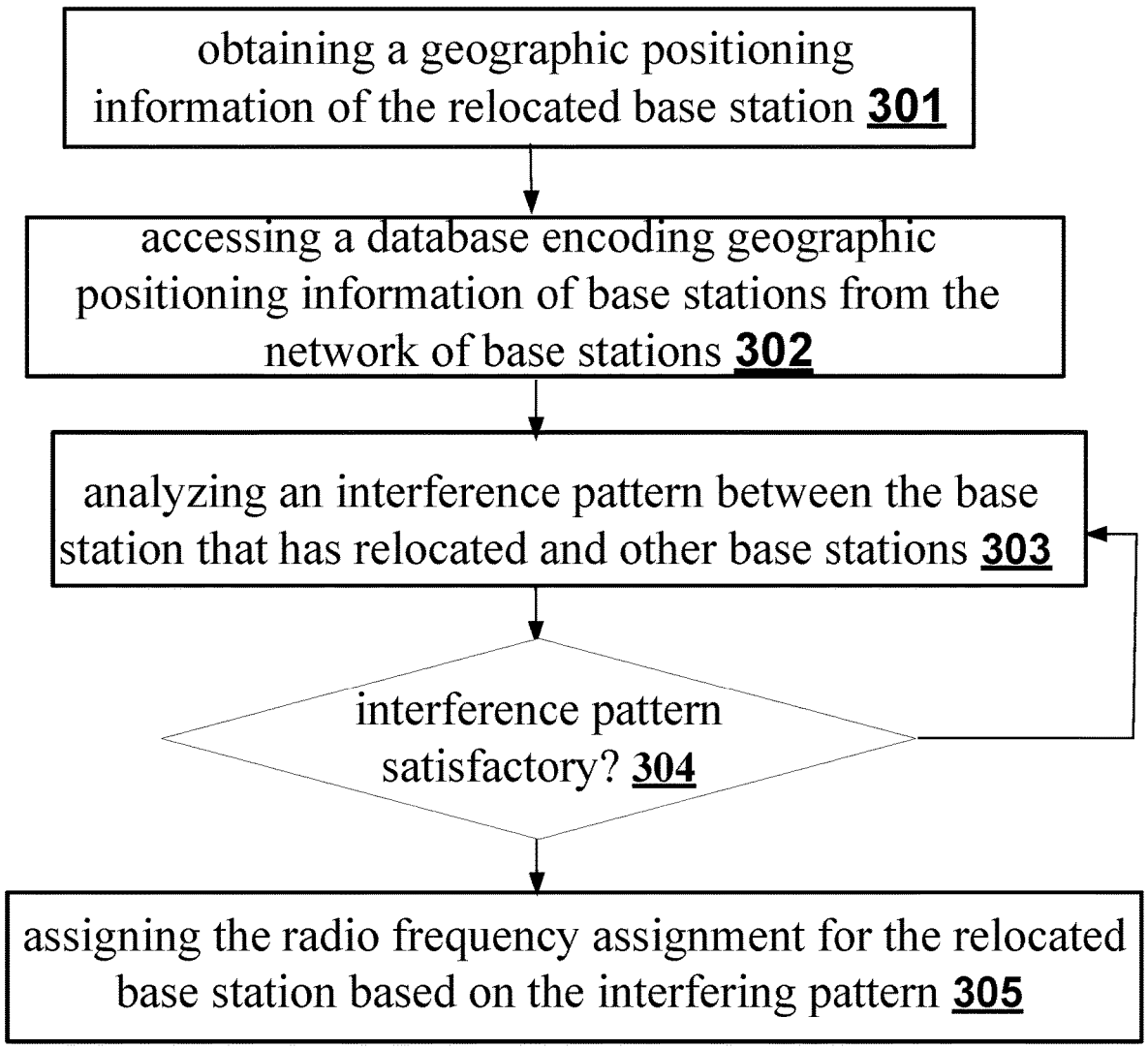
FIG. 3 is a flow chart illustrating an example of a process according to some implementations of the present disclosure.

As illustrated by the flow chart 300 of FIG. 3, an implementation may start with obtaining geographic positioning information of a relocated base station at a geo-exploration site (301). The geographic positioning information can be in the form of the GPS coordinate information. In some cases, a communication truck or an oil rig on which the base station is installed may be relocated to a new geolocation within the geo-exploration site. With this relocation, a radio network management system (NMS) 105 may be notified to initiate a frequency assignment for the relocated base station.

In these cases, the radio NMS 105 may then access a database with information of frequency assignment within the geo-exploration site (302). In one example, the database is hosted on a dynamic frequency management system (DFMS) 106. The database may include information encoding: approved frequencies from a National Communications Regulatory Agency for the entity running the geo-exploration site, the radio frequency operated, reused, or reserved at each base station, the GPS coordinate of each base station, elevation of each base station, antenna height configuration at each base station, antenna gain, radiation angle at each base station.

Based on the information from the database, the radio NMS 105, through the DFMS 106, may then simulate an interference pattern between the base station that has relocated and other base stations from the network that are within a threshold distance of the relocated base station (303). The threshold distance can vary, depending on the underlying; radio frequency. In some cases, the threshold distance may refer to a distance when frequency emissions, if within the threshold distance, can cause sufficient interference to hinder continued communication. In this analysis, the relocated base station is being considered for a radio frequency assignment based on the geographic positioning information.

The analysis can simulate the interference pattern when assigning the relocated base station a candidate radio frequency based on the geographic positioning information. The interference pattern may include: a co-channel interference, and an adjacent-channel interference. The analysis may also compute a coverage of the relocated base station relative to the other base stations from the network that are within a threshold distance of the relocated base station. The coverage relates to the extent to which a receiving device, such as a device within a typical distance from the base station would be able to operate. For example, an industrial site often include portable radios which can be handheld, or vehicle-mounted radio. The analysis can factor in an elevation of a base station, and an antenna height at the base station.

As illustrated, the implementations may then compare the interference pattern with a bench mark (304). For example, in response to the interference pattern falling below a first threshold level and the coverage exceeding a second threshold level, the implementation may allocate the candidate radio frequency to the relocated base station (305). Subsequently, the implementations may associating, in the database, the candidate radio frequency with the relocated base station.

Various implementations may continue to monitor a utilization of the relocated base station. For example, the implementations may monitor a traffic patter, and a usage pattern of the base station when assessing a quality of service of the relocated base station. In these implementations, in response to the utilization exceeding a utilization threshold, the implementations may then update the radio frequency assignment by repeating steps 302 to 305. For example, the implementations may analyze the interference pattern between the relocated base station and other base stations from the network that are within a threshold distance of the relocated base station when the relocated base station is to be assigned an updated radio frequency with increased capacity. The analysis may likewise simulate the interference pattern based on existing frequency assignment information in the database. Thereafter, in response to the interference pattern falling below the first threshold level, the implementations may allocate the updated radio frequency to the relocated base station; and associate, in the database, the updated radio frequency with the relocated base station.

Figure 4:
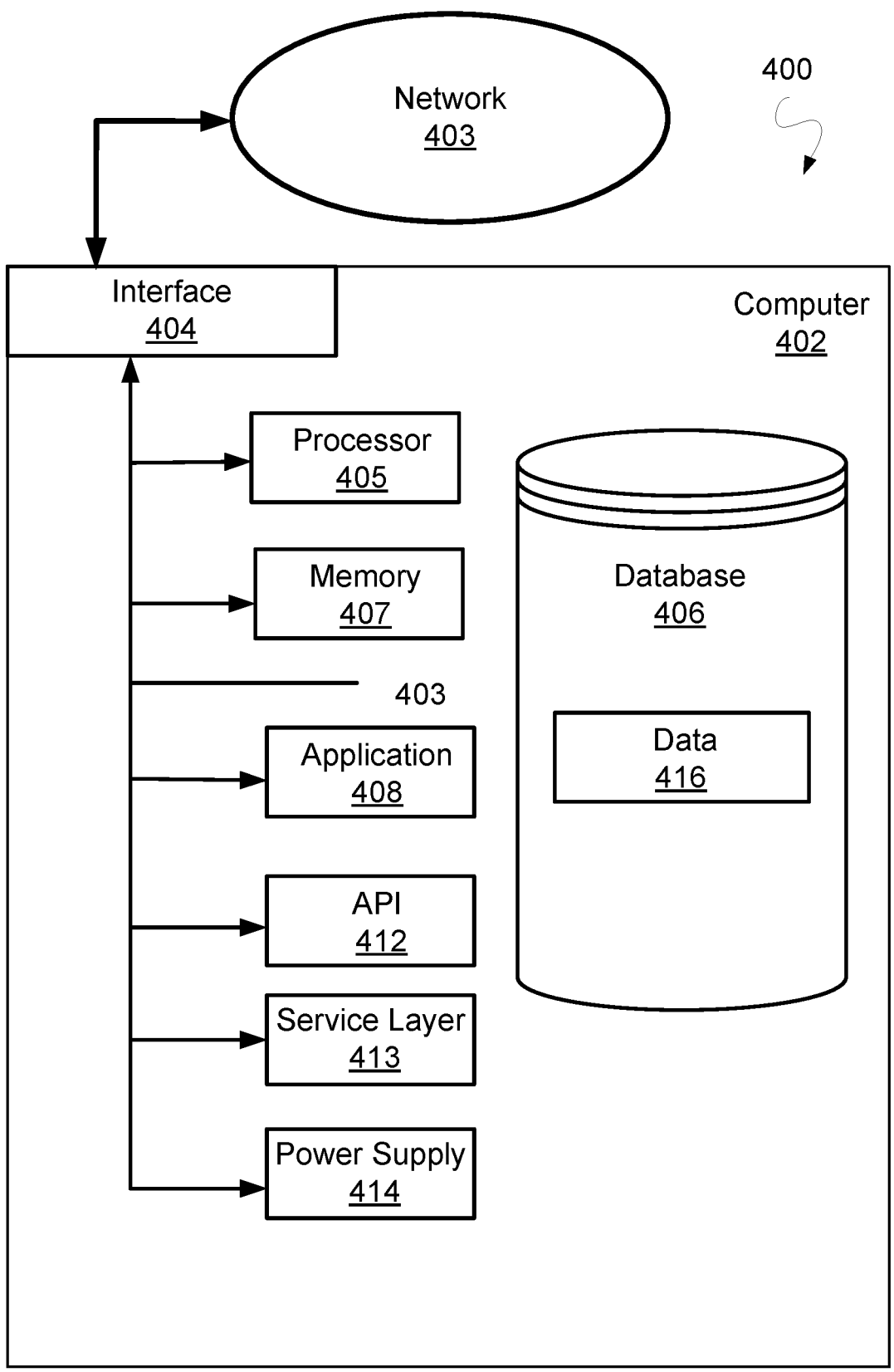
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 403. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 403 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 403 in a distributed environment. Generally, the interface 404 is operable to communicate with the network 403 and comprises logic encoded in software, hardware, or a combination of software and hardware. More specifically, the interface 404 can comprise software supporting one or more communication protocols associated with communications such that the network 403 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 403 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 can hold the previously described data 416 including, for example, information hosted at database at DFMS 106.

The computer 402 also includes a memory 407 that can hold data for the computer 402, another component or components communicatively linked to the network 403 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 403. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for radio frequency assignment within a network of base stations, the method comprising:
   in response to receiving information that a base station from the network of base stations has relocated, obtaining data encoding a geographic position of the relocated base station;
   accessing a database storing data encoding geographic positions of base stations from the network of base stations, and respective radio frequency assignment information for each base station;
   analyzing an interference pattern between the base station that has relocated and other base stations from the network that are within a threshold distance of the relocated base station, wherein the analyzing comprises:
      simulating the interference pattern when assigning the relocated base station a candidate radio frequency based on the geographic position of the relocated base station, and
      computing a coverage of the relocated base station relative to the other base stations from the network that are within a threshold distance of the relocated base station;
   determining the radio frequency assignment for the relocated base station based on the interference pattern; and
   in response to the interference pattern falling below a first threshold level and the coverage exceeding a second threshold level, allocating the candidate radio frequency to the relocated base station.

2. The computer-implemented method of claim 1, wherein the interference pattern comprises: a co-channel interference, and an adjacent-channel interference.

3. The computer-implemented method of claim 1, further comprising:
   associating, in a database, the candidate radio frequency with the relocated base station.

4. The computer-implemented method of claim 1, wherein the analyzing is based on an elevation of a base station, and an antenna height at the base station.

5. The computer-implemented method of claim 1, further comprising:
   monitoring a utilization of the relocated base station, wherein the utilization comprises: a traffic patter, and a usage pattern of the base station; and
   in response to the utilization exceeding a utilization threshold, analyzing the interference pattern between the relocated base station and other base stations from the network that are within a threshold distance of the relocated base station when the relocated base station is to be assigned an updated radio frequency with increased capacity.

6. The computer-implemented method of claim 5, further comprising:
   in response to the interference pattern falling below the first threshold level, allocating the updated radio frequency to the relocated base station; and
   associating, in the database, the updated radio frequency with the relocated base station.

7. A computer system comprising one or more processors configured to perform operations of:
   in response to receiving information that a base station from a network of base stations has relocated, obtaining data encoding a geographic position of the relocated base station;
   accessing a database storing data encoding geographic positions of base stations from the network of base stations, and respective radio frequency assignment information for each base station;

analyzing an interference pattern between the base station that has relocated and other base stations from the network that are within a threshold distance of the relocated base station; wherein the analyzing comprises:
- simulating the interference pattern when assigning the relocated base station a candidate radio frequency based on the geographic position of the relocated base station, and
- computing a coverage of the relocated base station relative to the other base stations from the network that are within a threshold distance of the relocated base station;

determining the radio frequency assignment for the relocated base station based on the interference pattern; and in response to the interference pattern falling below a first threshold level and the coverage exceeding a second threshold level, allocating the candidate radio frequency to the relocated base station.

8. The computer system of claim 7, wherein the interference pattern comprises: a co-channel interference, and an adjacent-channel interference.

9. The computer system of claim 7, further comprising:
associating, in the database, the candidate radio frequency with the relocated base station.

10. The computer system of claim 7, wherein the analyzing is based on an elevation of a base station, and an antenna height at the base station.

11. The computer system of claim 7, further comprising:
monitoring a utilization of the relocated base station, wherein the utilization comprises: a traffic patter, and a usage pattern of the base station; and in response to the utilization exceeding a utilization threshold, analyzing the interference pattern between the relocated base station and other base stations from the network that are within a threshold distance of the relocated base station when the relocated base station is to be assigned an updated radio frequency with increased capacity.

12. The computer system of claim 11, further comprising:
in response to the interference pattern falling below the first threshold level, allocating the updated radio frequency to the relocated base station; and associating, in the database, the updated radio frequency with the relocated base station.

13. A non-transitory computer-readable medium comprising software instructions that, when executed by a computer, causes the computer to perform operations of:
in response to receiving information that a base station from a network of base stations at a geo-exploration site has relocated, obtaining data encoding a geographic position of the relocated base station;

accessing a database storing data encoding geographic positions of base stations from the network of base stations at the geo-exploration site, along with respective radio frequency assignment information for each base station;

analyzing an interference pattern between the base station that has relocated and other base stations from the network that are within a threshold distance of the relocated base station; wherein the analyzing comprises:
- simulating the interference pattern when assigning the relocated base station a candidate radio frequency based on the geographic position of the relocated base station, and
- computing a coverage of the relocated base station relative to the other base stations from the network that are within a threshold distance of the relocated base station;

determining the radio frequency assignment for the relocated base station based on the interference pattern; and in response to the interference pattern falling below a first threshold level and the coverage exceeding a second threshold level, allocating the candidate radio frequency to the relocated base station.

14. The non-transitory computer-readable medium of claim 13, wherein the operations further comprise:
associating, in the database, the candidate radio frequency with the relocated base station.

* * * * *